June 29, 1954 A. W. UHL 2,682,613
UNIT FOR DETECTING SUSPENDED MATTER IN FLUIDS
Filed Aug. 3, 1950
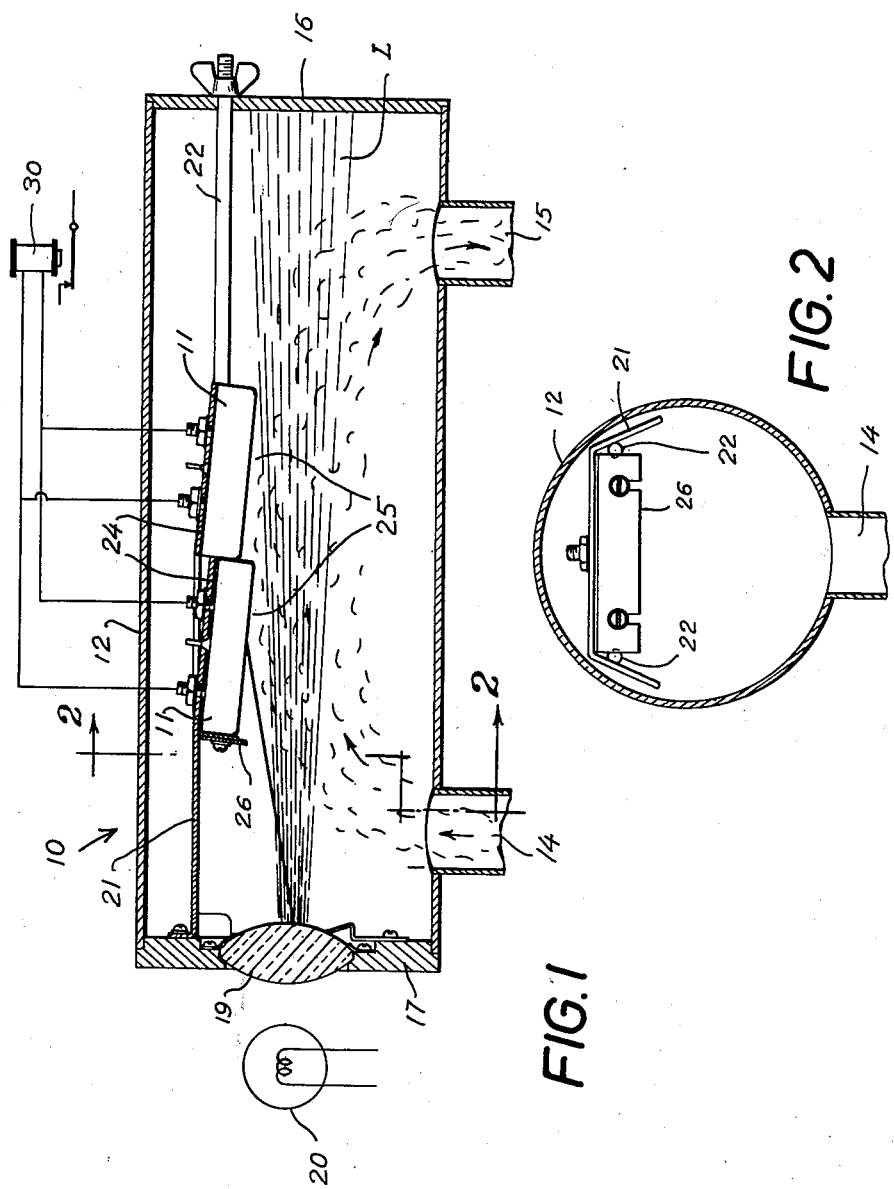
INVENTOR
ARTHUR W. UHL
BY
J. William Carson
ATTORNEY Patented June 29, 1954

2,682,613

UNITED STATES PATENT OFFICE 2,682,613

UNIT FOR DETECTING SUSPENDED MATTER IN FLUIDS

Arthur W. Uhl, Inwood, N. Y., assignor to Specialties Development Corporation, Belleville, N. J., a corporation of New Jersey Application August 3, 1950, Serial No. 177,393

6 Claims. (Cl. 250—218)

The present invention relates to apparatus of the light responsive type for detecting and indicating the presence of suspended matter in fluids, such as smoke or dust and the like in air, and, more particularly, to improvements in the unit of such apparatus which detects the suspended matter.

Generally, such units comprise a tubular casing through which a stream of the fluid to be tested for suspended matter is circulated, a light source for directing a beam of light through the stream of fluid along the longitudinal axis of the casing, and a current generating photoelectric element of the barrier-layer type located in the casing in a manner to respond to light rays reflected from suspended matter in the fluid stream.

Accordingly, an object of the present invention is to provide such a unit which is more sensitive and responsive to light rays reflected from the suspended matter.

Another object is to provide such a unit wherein the reflection of stray light within the casing is minimized.

Another object is to provide such a unit which is simple and economical in construction and reliable in operation.

A further object consists in the construction and arrangement of elements whereby the foregoing objects are accomplished.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, these objects are accomplished by providing a detecting unit of the foregoing character wherein the light sensitive surface of the photoelectric element is disposed laterally adjacent the light beam, but is out of the path thereof and is inclined towards the light source, preferably at a small angle, whereby the responsiveness of the photoelectric element to light rays reflected from the suspended matter is improved. The casing of the unit is cylindrical to minimize the reflection of stray light onto the element; and the inner diameter of the casing is much greater than the diameter of the beam of light whereby the reflection of stray light is further minimized.

A preferred embodiment of the invention has been chosen for purposes of illustration and description, and is shown in the accompanying drawing, forming a part of the specification, wherein:

Figure 1 is a longitudinal sectional view of a detecting unit in accordance with the invention and a schematic wiring diagram of a circuit in which the unit is connected.

Figure 2 is a sectional view taken along the line 2—2 on Figure 1.

Referring to the drawing in detail, there is shown a unit embodying the present invention which generally comprises a tubular casing 10 through which a fluid stream to be tested for suspended matter is circulated and into which a beam of light is directed, and one or more photoelectric elements 11 positioned in the casing for responding to light rays reflected from suspended matter in the fluid stream.

As shown herein, the casing 10 comprises a cylindrical side wall 12 having an inlet 14 and an outlet 15 for circulation of the fluid stream, a closed end wall 16, and an end wall 17 opposite the wall 16 in which a lens 19 is centrally mounted. A light source, such as an incandescent lamp 20, is positioned adjacent the lens at the exterior of the casing for directing a beam of light L into the casing along the longitudinal axis thereof and through the fluid stream. The interior of the casing has a highly light absorptive surface.

The photoelectric elements 11, of which two are illustrated for the purpose about to be made apparent, are mounted on the underside of a bracket 21 which is secured to the wall 17 and is supported by stay rods 22 attached to the wall 16. The bracket has a pair of longitudinal aligned extensions 24 inclined downwardly, preferably at an angle of about five degrees with respect to the longitudinal axis of the casing, in a direction from the wall 17 to the wall 16.

The photoelectric elements 11 are of the barrier-layer type and, as shown, are relatively thin and circular in shape. These elements are removably secured to the bracket extensions with their light sensitive surface 25 facing downwardly and inclined towards the beam of light. The bracket, its extensions and the photoelectric elements are so proportioned and arranged that light sensitive surfaces are laterally adjacent the light beam but are out of the path thereof whereby they will not be affected by direct light from the beam.

In the circuit shown in Figure 1, two photoelectric cells 11 are connected in parallel and across the terminals of electro-responsive means 30, such as a relay or galvanometer. Two cells are utilized because their characteristics are such that they generate the current required to effect operation of the responsive means which in this case is a relay.

With the foregoing arrangement, it has been found that the overall sensitivity and responsiveness of the unit is increased. This is made possible by inclining the light sensitive surfaces with respect to the longitudinal axis of the beam whereby these surfaces face a greater portion of the fluid stream than when positioned parallel to the light beam axis, and by positioning these surfaces to face towards the light source to take advantage of the phenomenon that illuminated suspended matter is more readily visible in the portions of the light beam nearest the source of light. This phenomenon is attributed to the fact that the beam diminishes in intensity as it extends away from the light source, whereby the suspended matter in the fluid stream nearest the light source will reflect the greatest amount of light within a given zone, the light sensitive surfaces being positioned to face such zones.

It is therefore possible for the photoelectric cells to receive sufficient light to generate current for effecting actuation of the electro-responsive means even when a relatively low concentration of suspended matter is present in the fluid stream. This is highly advantageous because, in the detection of smoke particles in air, for example, an indication is given at the commencement of a slight trace of smoke and no delay is occasioned in waiting for a high concentration of smoke to reflect sufficient light to render the elements responsive. In this manner, a fire in a ship's hold, a compartment or storage vault can be detected upon its incipience, and steps can be taken to extinguish the same before conflagration advances.

Stray light, directed towards the light sensitive surfaces of the photoelectric cell by reflection from the interior surfaces of the casing, is greatly minimized by utilizing a cylindrical casing. When stray light strikes the arcuate surface of the side wall 12 of the casing, only a minute portion thereof is reflected onto the light sensitive surfaces because such reflection can take place only at a plane surface directly opposite and facing the light sensitive surfaces. Since the arcuate surface of the side wall lacks plane surfaces, reflection can take place only at points on the wall surfaces which are in the same radial plane as the light sensitive surfaces.

The unit in accordance with the invention is therefore not subject to the disadvantages encountered in connection with prior units wherein rectangular casings were utilized. The walls of such rectangular casings had plane surfaces which reflected stray light from the entire width of the beam onto the sensitive surface. In practice, it has been found that stray light which affects the photoelectric elements can be reduced from a value of twenty to a value of eight by utilizing a cylindrical casing instead of a rectangular casing. This enables the photoelectric elements to be arranged to cause an extremely low output thereof to effect normal operation of the electro-responsive means, thus minimizing the effects of variations of the light beam intensity and of the temperature to which the elements are subjected. Also, the elements in this manner function within the range at which their output characteristics are least likely to vary upon aging or due to other inherent factors. Consequently, the units in accordance with the invention can more fully utilize the sensitivity of the cells whereby the overall sensitivity and responsiveness of these units are increased without risk of unreliable operation.

It has also been found that the effectiveness of reflected stray light onto the photoelectric elements can be further minimized by providing a cylindrical casing which has a much greater inner diameter than the diameter of the light beam. Preferably, the casing and beam are so proportioned that the inner diameter of the casing is at least four times as great as the diameter of the light beam adjacent the photoelectric elements. Any reflected stray light reaching the elements is of a relatively low intensity.

By positioning the photoelectric elements as described herein and minimizing the reflection of stray light, the units in accordance with the invention have greater all over sensitivity and reliability, whereby slight traces of suspended matter will be readily detected but no false alarm indications will be given.

As shown herein, the light sensitive surfaces of the photoelectric elements, while being inclined towards the light source, are shielded against direct light rays of the beam or stray light rays substantially parallel to the beam. This is accomplished by suitable shielding means positioned between the light source and the end of each element nearest the light source, preferably adjacent the element. The element nearest the light source is provided with such means in the form of a transverse depending strip 26 or the like having its lower end extending beneath the side of this element nearest the light source and about level with the opposite side of this element. The other element is so positioned with respect to the element nearest the light source whereby the latter serves as shielding means for the former.

From the foregoing description, it will be seen that the present invention provides an improved detecting unit of the character indicated herein which is simple and economical in construction, is accurate and reliable in operation, and can readily withstand such usage to which it may normally be subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In apparatus for detecting suspended matter in fluids, the combination of a tubular casing having an inlet and an outlet for circulating a stream of fluid therethrough, a light source for directing a beam of light through the stream of fluid along the longitudinal axis of said casing, and a photoelectric element of the current generating type located in said casing with respect to the light beam and the fluid stream to receive light rays reflected from suspended matter in the fluid stream, the light sensitive surface of said photoelectric element being laterally adjacent the light beam but out of the path thereof and being inclined towards said light source.

2. Apparatus according to claim 1, wherein said photoelectric element is inclined at an angle of about five degrees with respect to the longitudinal axis of said casing.

3. Apparatus according to claim 1, wherein shielding means are provided at the side of said photoelectric element nearest the light source.

4. Apparatus according to claim 1, wherein a pair of photoelectric elements are provided in longitudinal alignment with respect to the axis of the light beam, and the element nearest said light source serves as shielding means for the other element.

5. Apparatus according to claim 1, wherein a pair of photoelectric elements are provided in longitudinal alignment with respect to the axis of the light beam and are spaced substantially equidistantly therefrom whereby the element nearest said light source serves as shielding means for the other element, and shielding means for the light sensitive surface of said element nearest said light source at and extending below the side thereof nearest said light source to about the level of the opposite side of said element nearest the light source.

6. Apparatus according to claim 1, wherein said casing is cylindrical and has an inner diameter at least about four times as great as the diameter of the beam of light adjacent said photoelectric element to minimize reflection of stray light onto said element.

References Cited in the file of this patent

UNITED STATES PATENTS

| Number | Name | Date |
| --- | --- | --- |
| 2,033,466 | Grant | Mar. 10, 1936 |
| 2,301,367 | Cahusac et al. | Mar. 19, 1940 |
| 2,464,211 | Cahusac et al. | Mar. 15, 1949 |
| 2,476,958 | Cahusac et al. | July 26, 1949 |
| 2,489,222 | Herbold | Nov. 22, 1949 |